US007332871B2

United States Patent
Lu

(10) Patent No.: US 7,332,871 B2
(45) Date of Patent: Feb. 19, 2008

(54) HIGH FREQUENCY POWER SOURCE CONTROL CIRCUIT AND PROTECTIVE CIRCUIT APPARATUS

(76) Inventor: Chao-Cheng Lu, 4-4, Alley 27, Lane 143, Chun Kung Road, Taipei (TW) 11614

( * ) Notice: Subject to any disclaimer, the term of this patent is extended or adjusted under 35 U.S.C. 154(b) by 299 days.

(21) Appl. No.: 11/110,326

(22) Filed: Apr. 4, 2005

(65) Prior Publication Data
US 2006/0220595 A1 Oct. 5, 2006

(51) Int. Cl.
*H05B 41/16* (2006.01)
*H05B 37/02* (2006.01)
*H05B 37/00* (2006.01)

(52) U.S. Cl. ............ 315/247; 315/276; 315/291; 315/312

(58) Field of Classification Search ............ 315/200 R, 315/201, 212, 213, 219, 220, 291, 312, 324, 315/DIG. 5, DIG. 7, 227 R, 246, 247, 224, 315/225, 226, 250, 276, 283

See application file for complete search history.

(56) References Cited

U.S. PATENT DOCUMENTS 5,666,279 A * 9/1997 Takehara et al. ............ 363/95
5,818,709 A * 10/1998 Takehara .................... 363/95

* cited by examiner

*Primary Examiner*—Thuy Vinh Tran
(74) *Attorney, Agent, or Firm*—Jacobson Holman PLLC

(57) ABSTRACT

A precision voltage control circuit applicable to a PWM (Pulse Width Modulation) circuit can offer CCFL (Cold Cathode Fluorescent Lamp) or EEFL (External Electrode Fluorescent Lamp) tubes a stable high frequency voltage or current, so that each CCFL or EEFL tube can get an appropriate compensation current and an optimal emitting efficiency and enhance its emitting quality. The circuit also has an overload current, low current, and overload voltage and low voltage protective circuit to protect the CCFL or EEFL tubes from being injured. The circuit can also be applied to the TFT LCD TV or other large LCD panels, and develops the best display effect of each LCD tube.

29 Claims, 13 Drawing Sheets

HIGH FREQUENCY POWER SOURCE CONTROL CIRCUIT AND PROTECTIVE CIRCUIT APPARATUS

BACKGROUND OF THE INVENTION

1. Field of the Invention

The invention is applicable to a backlight source device of a large or ultra-large LCD monitor, which needs multiple CCFLs (Cold Cathode Fluorescent Lamps) or EEFLs connected in parallel as a light source. The required high frequency power is supplied from electronic ballast or a switching power in order to protect the CCFL tubes or EEFL tubes with a single working frequency, a stable circuit, a high emitting efficiency, a high quality, and a small distortion. The invention provides a measurement and protective circuits and precise and stable voltage and current for PWM (Pulse Width Modulation) in order to supply the power to a TFT LCD TV system.

2. Description of the Related Art

When the conventional CCFLs or EEFLs are used in a backlight source for a LCD monitor, an inverter typically lights one or two CCFLs or EEFLs. When the conventional CCFLs or EEFLs are used in a large LCD monitor or a large television LCD display, five, ten or more than ten inverters have to be utilized, and the following drawbacks appear.

1. When one of more than ten CCFL tubes or EEFL tubes is damaged and cannot be lighted, the condition cannot be effectively detected, and the quality of the LCD monitor is influenced.

2. Because there are some differences between the high working frequencies of the inverters, many interference frequencies are generated in the LCD monitor, and the cost and burden for eliminating the electromagnetic interference are thus increased.

3. Because there are some differences between the output values of the high frequency voltages of the inverters, the luminances of the CCFLs or EEFLs are not the same, and the quality of the LCD monitor is influenced.

4. The cost of multiple inverters is higher than that of single electronic ballast or a single inverter.

Thus, it is an important subject of the invention to provide a CCFL tube or EEFL tube protective circuit capable of solving the above-mentioned problems of the conventional CCFLs or EEFLs used as the backlight source of the LCD monitor. In the CCFL tube or EEFL tube protective circuit, it is possible to detect one damaged tube among several tens of CCFL tubes or EEFL tubes, and the quality of the LCD monitor can be maintained using the technology of PWM precise stable voltage or current. Hence, the drawbacks of the need of multiple inverters, of the frequency interference, of the complicated structure and of the high cost can be solved.

SUMMARY OF THE INVENTION

In order to meet the requirements in the backlight source of a large or ultra-large LCD monitor effectively, the invention is made according to the following objects.

A first object of the invention is to provide a CCFL tube or EEFL tube protective circuit apparatus to solve the drawback of the requirement of multiple inverters in the prior art.

A second object of the invention it to utilize an electronic stabilizer as a single high frequency power in order to solve the prior art drawbacks of the requirement of multiple inverters, of the frequency interference, and of the high cost.

A third object of the invention is to provide a backlight source for a large or ultra-large LCD monitor, a LCD television display, a LCD advertising apparatus, and the like.

A fourth object of the invention is to solve the problems of some poor CCFL tubes or EEFL tubes and of the early deterioration by independently setting the compensation control for each of the CCFL tubes or EEFL tubes connected in parallel.

A fifth object of the invention is to provide a PWM precision stable voltage device and a PWM precision stable current device to solve the prior art drawbacks of the incapability of supplying the stabilized voltage or current to the CCFL tubes or EEFL tubes.

A sixth object of the invention is to provide a better hardware circuit in order to prove that the invention can be implemented and achieve the objects and effects.

In order to solve the prior art drawbacks of multiple inverters applied to the large LCD monitor, the invention has the following features.

1. The measurement component serially connected to each of the CCFL tubes or EEFL tubes can be a single high-precision high-voltage resistor or diodes according to the feature of the CCFL or EEFL.

2. The photocoupler may be a typical photocoupler or a photo thyristor having a primary side being a LED, and a secondary side being a transistor or thyristor. The power of the primary side is supplied, through a current-limiting resistor, by the voltage across two terminals of the measurement component serially connected to a single CCFL or EEFL.

3. In order to enhance the sensitivity of the primary terminals of the photocoupler, a full-wave rectification circuit, which has a DC positive terminal and a DC negative terminal connected to the primary side of the photocoupler, is used.

4. The overload current, low current, overload voltage and low voltage comparator circuits in the protective circuit can function to achieve the setting comparisons of the ON and OFF of the CCFL tubes or EEFL tubes, the too-high current induced by the too-high voltage of the high frequency power, and the too-low current induced by the too-low high frequency voltage, such that the objects of protection and enhancing the emitting quality can be achieved.

5. The delay circuit is characterized in that the overload current, low current, overload voltage and low voltage comparator circuits does not operate until the electronic ballast works stably, all the CCFL tubes or EEFL tubes emit light, and a period of time has elapsed. So, the power-on/power-off state of the high frequency power circuit can be determined. The delay time of the delay circuit is determined according to the number, the properties and the qualities of the CCFL tubes or EEFL tubes.

6. The DC high-voltage power input of the DC power supply circuit can be taken from the boosting DC power supply source of the active power factor corrector, or the boosted DC power supply source. A PWM DC power supply circuit is used. The outputted DC power is supplied to the delay circuit, the PWM and high frequency power output circuit and the CCFL or EEFL tube protective circuit 7. The high frequency power output circuit adopts a full-bridge type or a half-bridge type oscillation circuit to have a single high frequency power, a sufficient high frequency output power, and a single output voltage value.

8. Each of the CCFL tubes or EEFL tubes can get the set tube current compensation, so the quality of the LCD monitor, LCD television or LCD advertising apparatus can be greatly enhanced.

9. Using the PWM precision voltage stabilizing circuit and the PWM precision circuit stabilizing circuit can enhance the emitting quality of the CCFL tubes or EEFL tubes and the stability of the supplied voltage or current to the CCFL tubes or EEFL tubes.

DETAILED DESCRIPTION OF THE INVENTION

Figure 1:
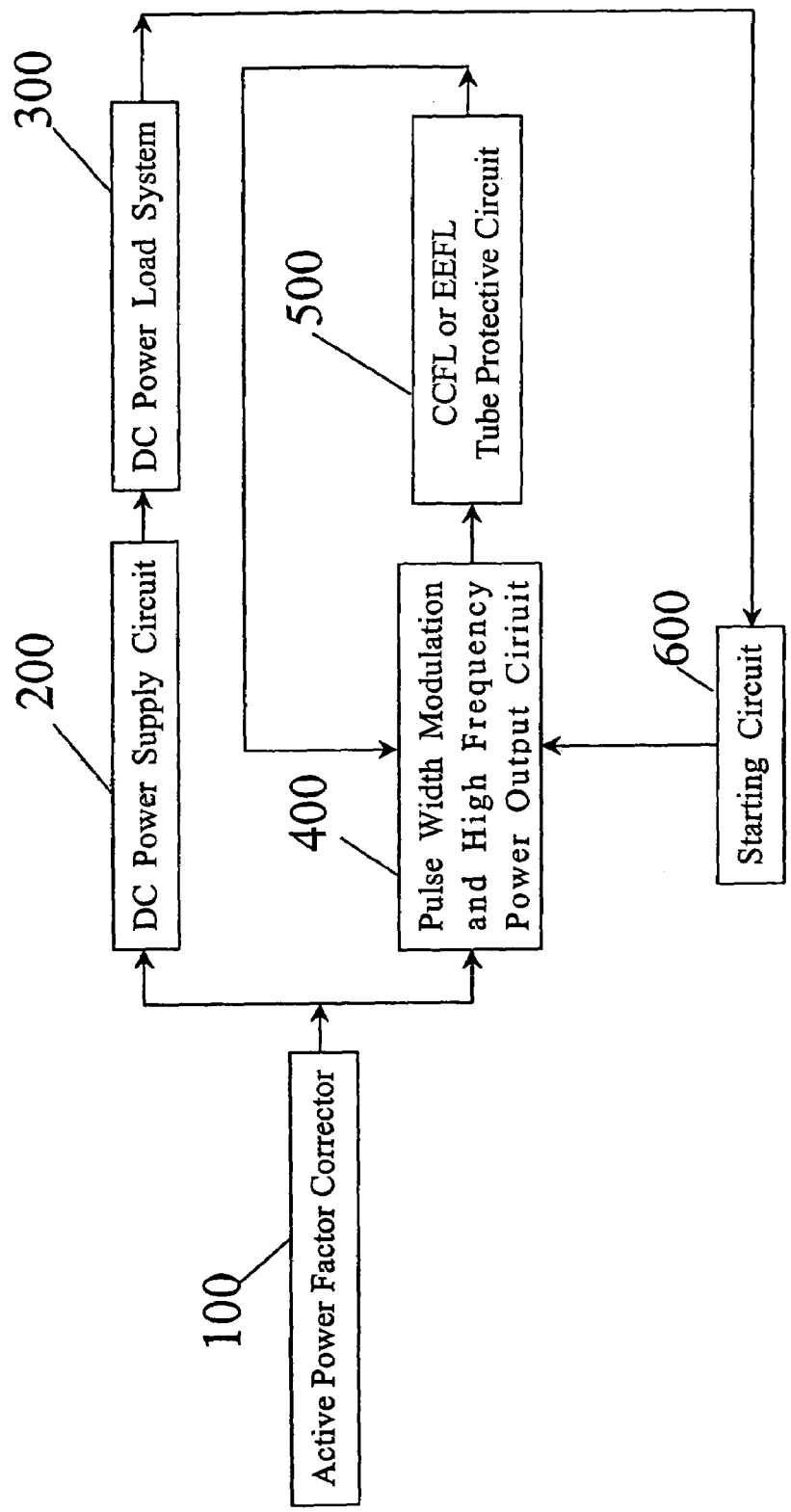
FIG. 1 is a block diagram showing a high frequency power source control circuit and a protective circuit apparatus of the invention.

FIG. 1 is a block diagram showing a high frequency power source control circuit and a protective circuit apparatus of the invention. As shown in FIG. 1, the control circuit includes an active power factor corrector 100, a DC power supply circuit 200, a DC power load system 300, a PWM (Pulse Width Modulation) and high frequency power output circuit 400, a CCFL (Cold Cathode Fluorescent Lamp) tubes or EEFL tubes protective circuit 500 and a starting circuit 600. The active power factor corrector 100 includes input power supply terminals and a circuit device for avoiding electric shocks and electromagnetic interferences. The DC power load system 300 can supply the power to a tuner system of a TFT LCD TV, or power supply systems of other large LCD panels.

Figure 2:
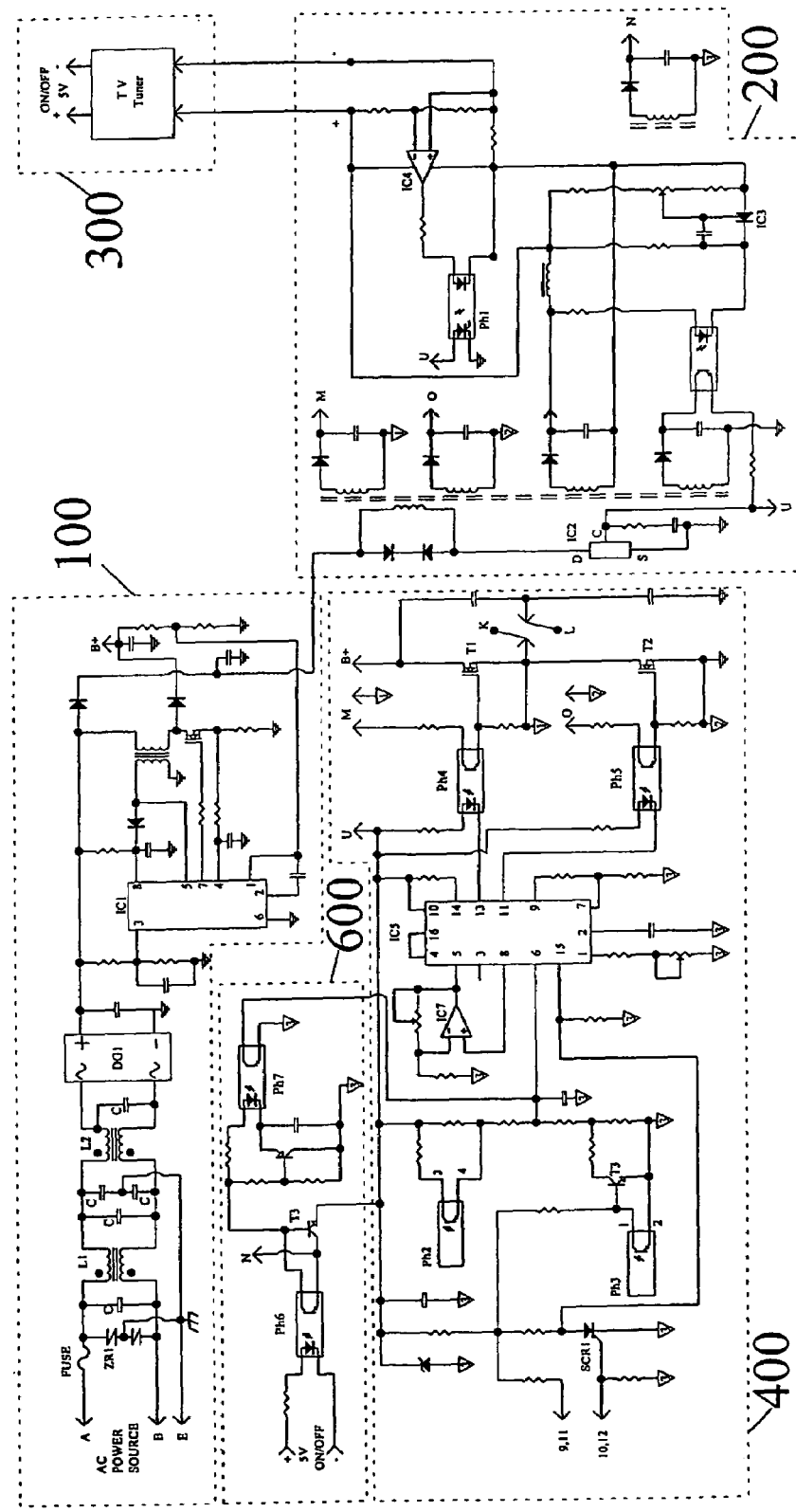
FIG. 2 shows the high frequency power source control circuit of the invention.

FIG. 2 shows the high frequency power source control circuit of the invention. The input terminals of the active power factor corrector 100 are AC power input terminals for receiving an input voltage ranging from 90V to 265V and a power frequency of 50 Hz or 60 Hz. The AC power flows through a fuse and anti-electric-shock components $ZR_1$ and $ZR_2$. An electromagnetic interference filter circuit is composed of $L_1$ and $L_2$ inductor coil sets and a condenser set C. In order to avoid the instant inrush of the input power, a negative temperature coefficient resistor element NTC is provided. The AC power is inputted into the protective circuit and then transferred to AC terminals of a full-wave rectifier $DG_1$. A positive terminal and a negative terminal at a DC side of the full-wave rectifier $DG_1$ supply the power to the active power factor corrector 100, and then an active power factor correction integrated circuit $IC_1$ corrects the power factor and boosts the voltage so as to obtain a DC power B+ of about 400V at the B+ terminal. The DC power B+ is supplied to the DC power supply circuit 200 and the PWM and high frequency power output circuit 400.

The DC power supply circuit 200 is a single-piece of switch power integrated circuit $IC_2$ capable of receiving an input voltage substantially ranging from DC 120V to 700V with a power efficiency of 80% or more than 80%, and a programmable precision shunt regulator integrated circuit $IC_3$ for outputting an output voltage of 2.5V to 36V as that outputted from a programmable precision shunt regulator. The DC power supply circuit 200 further has an overload current protective circuit composed of a comparison integrated circuit $IC_4$. When the load is too large, a first photocoupler $Ph_1$ disables the single-piece of switch power integrated circuit $IC_2$ and no DC power is outputted. The first photocoupler $Ph_1$ has a structure of a photo thyristor. The DC power supply circuit 200 has four DC output portions, wherein the first portion supplies a power for the main load DC power load system 300, the second portion supplies a power for all N-terminals of the invention, the third portion supplies a power for M-terminals, and the fourth portion supplies a power for O-terminals and gates of a power MOSFET (metal oxide field effect transistor) $T_1$ and a power MOSFET $T_2$ of the PWM and high frequency power output circuit 400. The four powers are outputted independently.

The PWM and high frequency power output circuit 400 has a PWM circuit using a PWM integrated circuit (PWM IC) as a main circuit, such as MC 3520, UC3842 or UC1864. The circuit is characterized in that second and third photocouplers $Ph_2$ and $Ph_3$ serve as components for controlling a pulse width of a PWM integrated circuit $IC_5$. An operational amplifier integrated circuit $IC_6$ (Operational amplifier IC) for controlling and amplifying the sawtooth wave of the integrated circuit $IC_5$ is used to get the optimal control effect. Two output terminals of the integrated circuit $IC_5$ are respectively coupled to fourth and fifth photocouplers $Ph_4$ and $Ph_5$, which transfer pulse signals to gates of a power MOSFET $T_1$ and a power MOSFET $T_2$. The gate of the power MOSFET $T_1$ is coupled to the M-terminal DC power, and the gate of the power MOSFET $T_2$ is coupled to the O-terminal DC power. The input terminals of the two power MOSFETs $T_1$ and $T_2$ have no noise to interfere a half-bridge type oscillation circuit so as to replace the conventional transformer coupling method. In addition, the O-terminal and M-terminal DC powers are independent powers, the output terminals K and L of the half-bridge type oscillation circuit are coupled to K and L terminals of a primary coil of a high frequency transformer TS, and a secondary coil terminal thereof has a dedicated set of tap H terminal for the CCFL or the EEFL as a dedicated set of H terminals of a voltage detection and protective circuit.

The operation principle of the starting circuit 600 is described as follows. When the DC power load system 300 receives the supplied DC power, the system 300 generates a voltage to respond with the supplied power. The voltage may be 5V or others. When the input terminals of the starting circuit 600 receive the voltage, a secondary side of a sixth photocoupler $Ph_6$ becomes an ON state. At this time, the N-terminal DC power is serially coupled to the LED of a seventh photocoupler $Ph_7$ from the secondary side of a sixth photocoupler $Ph_6$ to a time constant resistor $R_1$ and then serially coupled to a time constant condenser $C_1$ to form a short time control circuit. That is, the LED emits light only for a moment. When the LED is emitting light, the secondary side of the photocoupler $Ph_7$ has the control voltage terminal (6) of the integrated circuit $IC_5$ being short-circuited. At this time, the pulse width between two output voltages of the integrated circuit $IC_5$ reaches the maximum, and the feature is used to achieve the starting function.

A tuner of a TFT LCD TV serves as one example of the DC power load system 300. When the DC power supply circuit 200 is supplying the power to the DC power load system 300, a voltage is outputted from an output side of the DC power load system 300 as a starting power of the invention, and the voltage at the output side is transferred to the input terminals of the starting circuit 600 to achieve the starting function.

Figure 3:
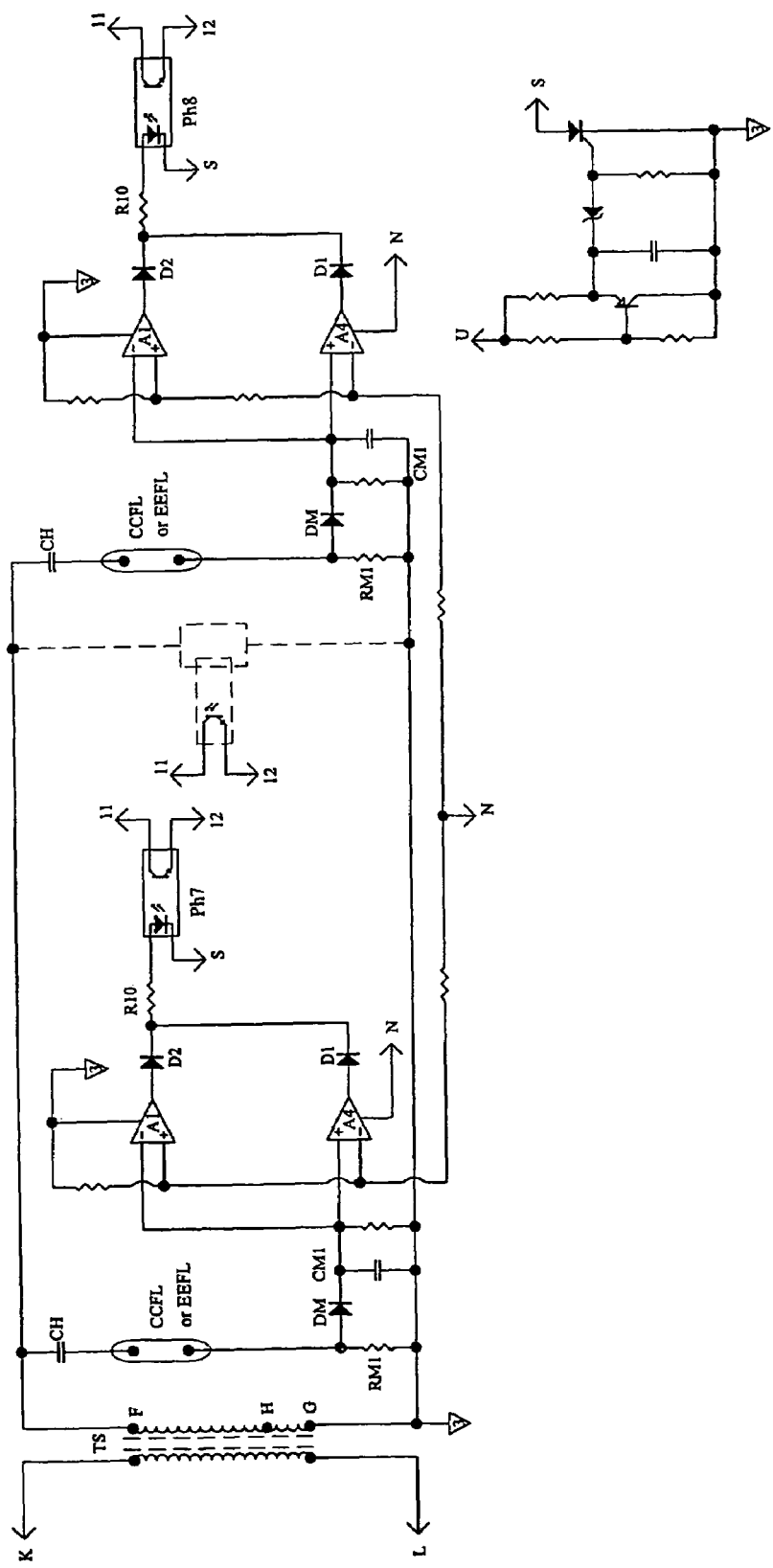
FIG. 3 shows an overload current/low current protective circuit according to an embodiment of the invention.

FIG. 3 shows an overload current/low current protective circuit according to an embodiment of the invention. In the CCFL tube or EEFL tube protective circuit 500 of the invention, the K and L terminals of the primary coil of the high frequency transformer TS are coupled to the K and L terminals of the half-bridge type oscillation circuit of the PWM and high frequency power output circuit 400 of FIG. 2, and the terminals F and G of the secondary coil of the high frequency transformer TS are coupled to the CCFL or the EEFL circuit. The feature is that the F terminal is coupled to a high-voltage condenser $C_H$ and serially connected to the CCFL, two bridge rectifiers $DG_2$ and $DG_3$, and a measurement resistor $R_{M1}$. This is a basic combination of a CCFL tubes or EEFL tubes, and multiple CCFL tubes or EEFL tubes may be coupled to the F and G terminals.

The protective circuit is provided with an overload current, low current, overload voltage and low voltage protective circuit. When the voltage across the two terminals of the measurement resistor $R_{M1}$ of the CCFL or EEFL unit is too large, it represents that the CCFL or EEFL unit is short-circuited or has a leakage current. At this time, the voltage drop between the two terminals of $R_{M1}$ greatly increases. The high frequency current is rectified by the rectifying diode DM, and then filtered by the filter condenser $C_{M1}$ into a DC voltage, which is transferred to comparators $A_1$ and $A_4$ for performing a voltage comparison. When the voltage across two terminals of the filter condenser $C_{M1}$ is higher than a voltage at the negative terminal of $A_4$, the comparator $A_4$ outputs a positive voltage through the diode $D_1$ to the current-limiting resistor $R_{10}$ to the LED of the photocoupler $Ph_8$. At this time, the output side of the photocoupler $Ph_8$ is in an ON state. Because the thyristor $SCR_1$ is in the ON state, the enable pin (15) of the integrated circuit $IC_5$ of the pulse width modulation circuit is in a zero potential state, the integrated circuit $IC_5$ is disabled, and the half-bridge type oscillation circuit is also enable. The K and L terminals and F and G terminals of the high frequency transformer TS have no voltage thereacross, and the object of overload current protection can be achieved. If the voltage across two terminals of the measurement resistor $R_{M1}$ is too low or zero, it means that the CCFL or the EEFL is open circuited, or the voltage across the F and G terminals is too low. At this time, the comparator $A_1$ operates to output a positive voltage to the LED of the photocoupler $Ph_8$ through the diode $D_2$ and the current-limiting resistor $R_{10}$, the output side of $Ph_8$ is in the ON state, and the integrated circuit $IC_5$ is disabled. No voltage appears at the F and G terminals of the high frequency transformer TS, and the object of low current protection can be achieved.

Figure 4:
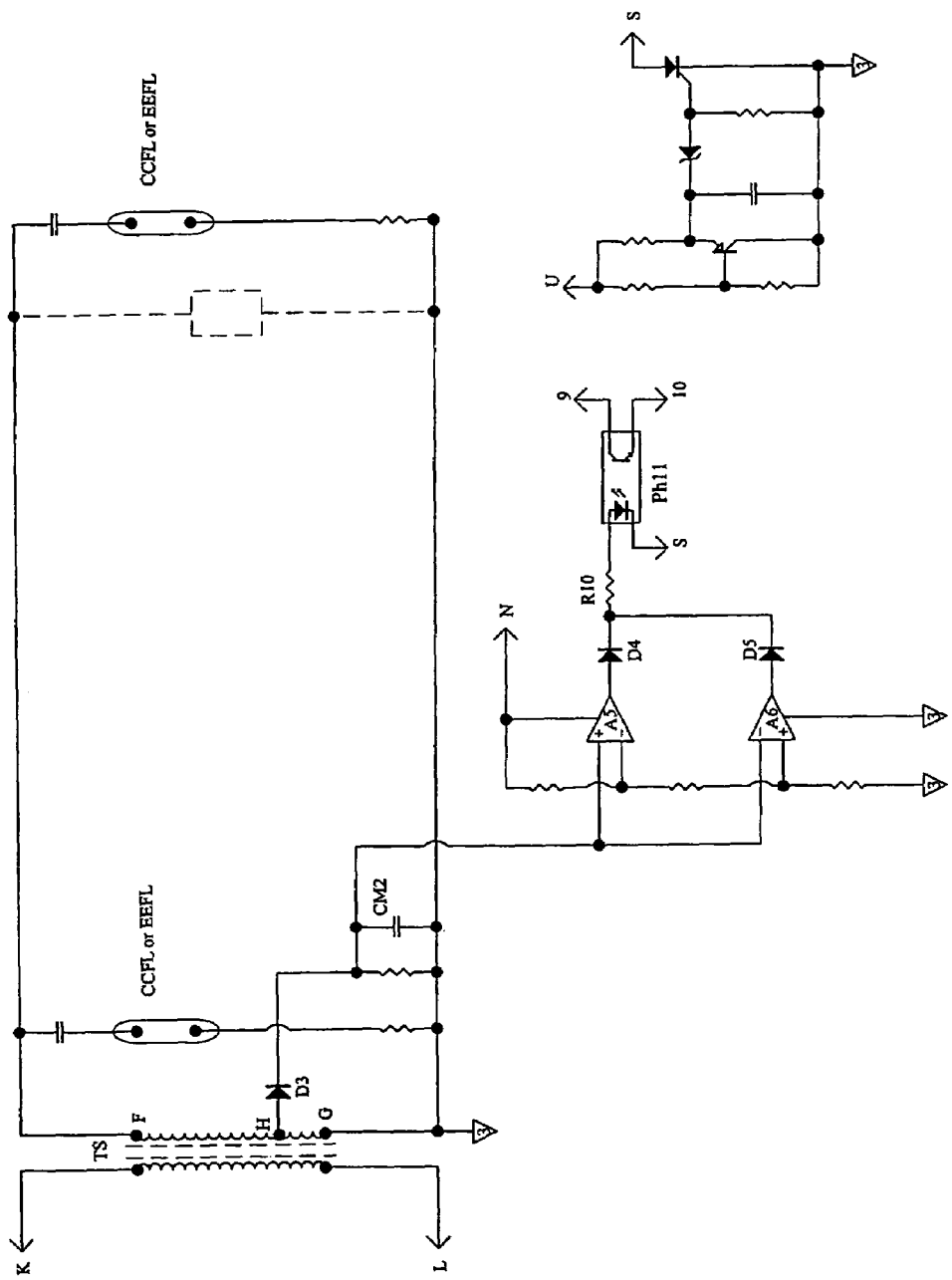
FIG. 4 shows an overload voltage, low voltage protective circuit according to the embodiment of the invention.

FIG. 4 shows an overload voltage, low voltage protective circuit according to the embodiment of the invention. A tap H terminal between F and G terminals of the secondary coil of the high frequency transformer TS serves as a voltage measurement point so that the voltages at the F and G terminals can be judged, a current flowing through the Tap H terminal is rectified by a diode $D_3$ and then flows through the filter condenser $C_{M2}$ to form a DC voltage. The voltage across the H and G terminals is proportional to that across the F and G terminals by the number of turns. The voltage across the F and G terminals can be read according to the voltage across the H and G terminals as well as this proportion. Therefore, if the voltage across the F and G terminals rises, the voltage across the H and G terminals also rises. At this time, the voltage across two terminals of the filter condenser $C_{M2}$ also rises. If the voltage of the filter condenser $C_{M2}$ is higher than the set negative terminal voltage of the comparator $A_5$, the comparator $A_5$ outputs a positive voltage to the LED terminal of the photocoupler $Ph_{11}$ through the diode $D_4$ and the current-limiting resistor $R_{11}$, such that the output side of $Ph_{11}$ is in the ON state, the integrated circuit $IC_5$ of FIG. 2 is disabled, the voltage across the F and G terminals of the high frequency transformer disappears, and the object of overload voltage protection is achieved. When the voltage across the F and G terminals is too low, the voltage across two terminals of $C_{M2}$ also decreases. At this time, the comparator $A_6$ generates a positive voltage and outputs the positive voltage to the LED of the photocoupler $Ph_{11}$ through the diode $D_5$ and the current-limiting resistor $R_{11}$. At this time, the output side of the photocoupler $Ph_{11}$ is in the ON state. Similar to the overload voltage effect, the voltage across the F and G terminals of the high frequency transformer TS is zero, and the object of low voltage protection can be achieved.

Figure 5:
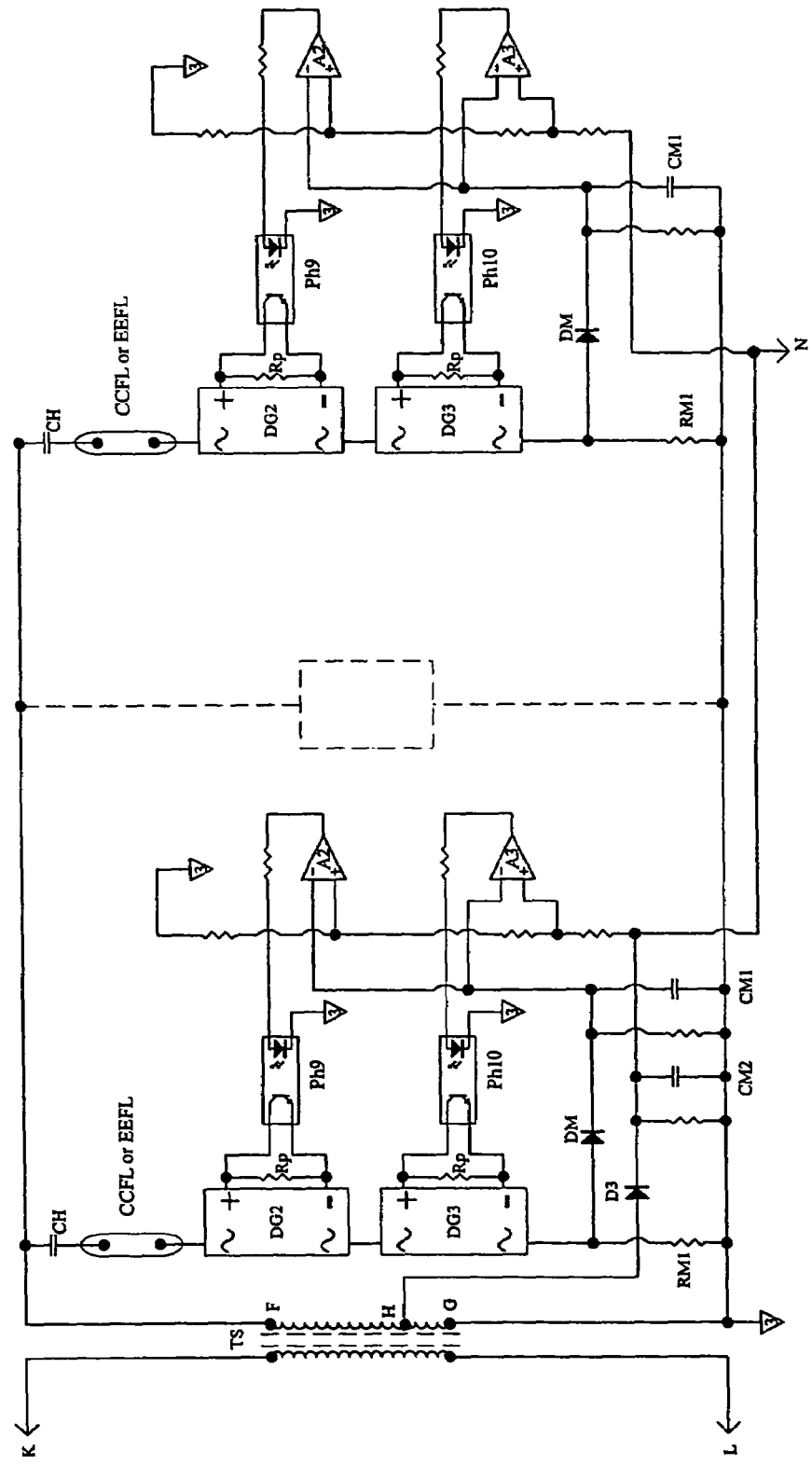
FIG. 5 shows CCFL tube or EEFL tube current control circuits according to a first embodiment of the invention.

FIG. 5 shows CCFL or EEFL tubes current control circuits according to the embodiment of the invention. The operation principle of the control circuit is described as follows. First, the tube voltage of the CCFL or the EEFL is set as $V_1$, the voltage across the two terminals of the high-voltage condenser $C_H$ is set as $V_2$. The positive and negative output terminals of the second bridge rectifier $DG_2$ are coupled to output terminals of the photocoupler $Ph_9$. When the output side of the photocoupler $Ph_9$ is in the OFF state and ON state, the breakdown voltage value thereof is set as 100V and 0.4V, respectively. Similarly, when the output side of the photocoupler $Ph_{10}$ is in the OFF state and the ON state, the breakdown voltage value thereof is set as 100V and 0.4V, respectively. For the sake of simplification, the voltage drops of the bridge rectifier $DG_2$ in the ON and OFF states are 0V and $V_3$, respectively. The voltage drops of the bridge rectifier $DG_3$ in the ON and OFF states are 0V and $V_4$, respectively. The voltage drops between the two terminals of the measurement resistor $R_{M1}$ is $V_5$, and the voltage across the two terminals of the high frequency transformer TS is set as $V_{FG}$, wherein $V_{FG}=V_1+V_2+V_3+V_4+V_5$. It is set that $V_2=1100V$ to meet the standard value of the CCFL or EEFL, and $V_3$ and $V_4$ have four states: (1) $V_3+V_4$; (2) $V_3+0$ V; (3) 0 V+$V_4$; and (4) 0 V+0 V. Because $V_3+0V=0V+V_4$, three conditions exist. First, when the CCFL or the EEFL tube current is too small, the second state 0V+0V has to be used such that the tube current rises.

Second, if the CCFL or the EEFL tube current is too high, the first state $V_3+V_4$ has to be used to decrease the tube current. Third, the third state $V_3+OV$ or $OV+V_4$ is used when the CCFL or EEFL tube current is normal. Thus, when $V_{FG}=V_1+V_2+V_5$, the comparators $A_2$ and $A_3$ execute the functions of $V_3$ and $V_4$. If $V_3$ and $V_4$ are set as 100V, $V_1=1100V$, $V_5=10V$, and $V_{FG}$ rises 200V, the $V_5$ value rises more than 10V due to the rise of the CCFL or the EEFL tube current. At this time, the output sides of the photocouplers $Ph_9$ and $Ph_{10}$ are in the OFF state so as to offset the rise of 200V of $V_{FG}$. If the $V_{FG}$ decreases 200V, the $V_5$ decreases smaller than 10V due to the decrease of the CCFL or the EEFL tube current. At this time, the output sides of the photocoupler $Ph_9$ and $Ph_{10}$ are in the ON state so as to increase $V_{FG}$ value by 200V. If the CCFL tube or the EEFL tube works under the normal tube current, the tube is in the third state of the invention. In this state, the output terminal of the comparator $A_3$ outputs a positive voltage such that the photocoupler $Ph_{10}$ is in the ON state, the output terminal of the comparator $A_2$ has no voltage output, and the photocoupler $Ph_9$ is in the OFF state, the voltage drop resistor is to perform the function of voltage drop, and parallel the output of the photo coupler $Ph_9$ and $Ph_{10}$. Similarly, if the output voltage $V_{FG}$ of the high frequency transformer TS is fixed and when the CCFL tube current or the EEFL tube current is changed, the comparators $A_2$ and $A_3$ also can execute the above-mentioned three states for adjusting the CCFL tube current or the EEFL tube current. The values of $V_3$ and $V_4$ may be modified according to the property of the CCFL tube or the EEFL tube.

Figure 6:
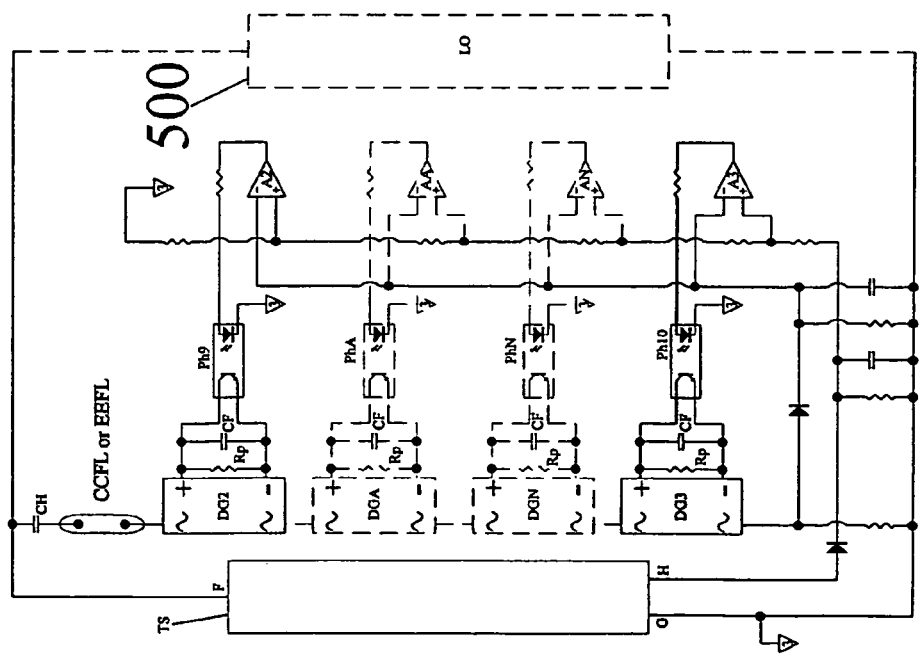
FIG. 6 shows CCFL tube or EEFL tube current control circuits according to a second embodiment of the invention.

FIG. 6 shows CCFL or EEFL tube current control circuits according to a second embodiment of the invention. As shown in FIG. 5, two CCFL or EEFL tube current control circuits are provided. Multiple CCFL or EEFL tube current control circuits may be added in FIG. 6 in order to increase the control range of the CCFL or EEFL tube current. In FIG. 6, the bridge rectifier $DG_A$ to the bridge rectifier $DG_N$ represent that multiple bridge rectifiers are used. The bridge rectifier $DG_A$, the photocoupler $Ph_A$ and the comparator $A_A$ constitute one set, while the bridge rectifier $DG_N$, the photocoupler $Ph_N$ and the comparator $A_N$ constitute another set. The bridge rectifiers $DG_2$, $DG_A$, $DG_N$ and $DG_3$ are connected in series, and the breakdown voltage of the output side of the photo coupler is determined according to the requirements. The operation principle of FIG. 6 is the same as that of FIG. 5.

Figure 7:
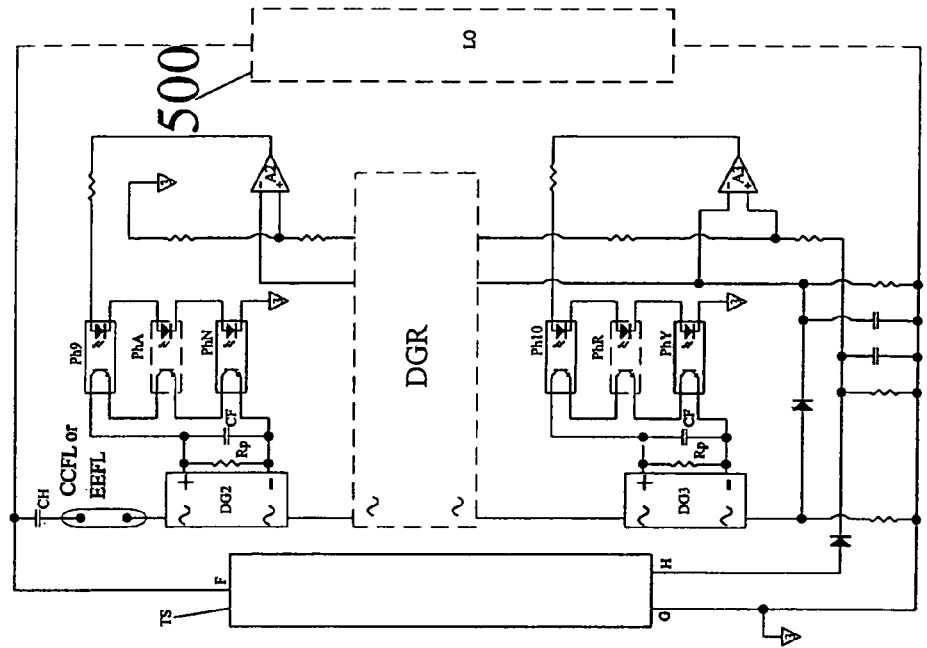
FIG. 7 shows CCFL tube or EEFL tube current control circuits according to a third embodiment of the invention.

FIG. 7 shows CCFL or EEFL tube current control circuits according to a third embodiment of the invention. As shown in FIG. 5, two CCFL or EEFL tube current control circuits are provided. Multiple output sides of photocouplers can be connected in series in FIG. 7 in order to increase the breakdown voltage of the photocoupler, wherein $DG_R$ means that multiple photocouplers are used. For example, if the breakdown voltage for each set is desired to be 250V, two photocouplers with the breakdown voltages of 100V and one photocoupler with the breakdown voltage of 50V may be connected in series. The number of serially connected photocouplers and the number of the control circuits can be determined according to the requirement. The function of the high frequency filter condenser $C_F$ is to make the positive and negative DC terminals of the bridge rectifier output the DC voltage, and is the same as that of the high frequency filter condenser $C_F$ of FIG. 6.

Figure 8:
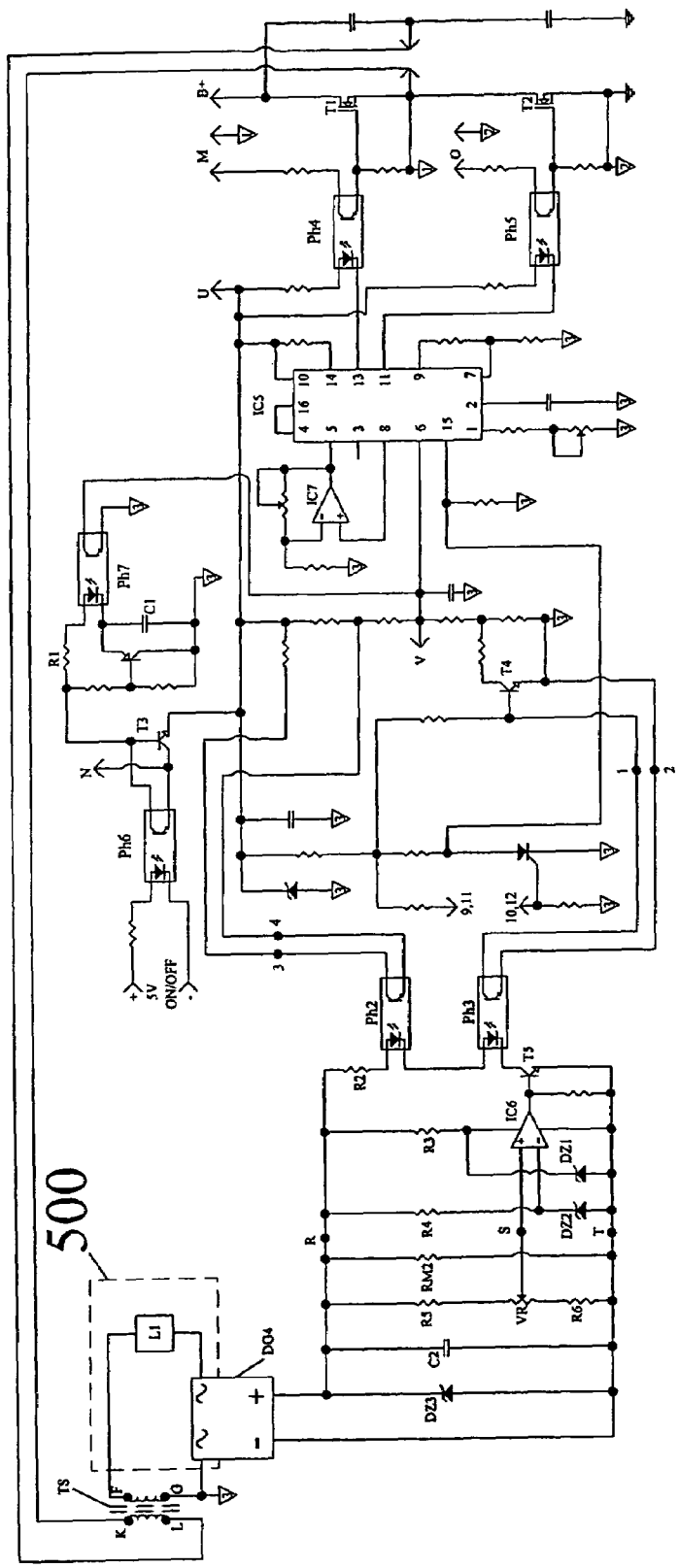
FIG. 8 shows a PWM and high frequency power output circuit according to a first current control embodiment of the invention.

FIG. 8 shows a PWM and high frequency power output circuit according to a first current control embodiment of the invention. When the starting circuit 600 has the input of 5V, the output side of the photocoupler $Ph_6$ is in the ON state. At this time, the emitter of the transistor $T_3$ outputs a voltage from the N-terminal power to a u terminal, while the PWM integrated circuit $IC_5$ receives the supplied voltage and in the operation state. The output side of the photocoupler $Ph_6$ supplies a voltage to the time constant resistor $R_1$, the LED of the photocoupler $Ph_7$ and the time constant condenser $C_1$. The output side of the photocoupler $Ph_7$ is in the ON state at the moment, so the potential of the control voltage terminal (6) of the integrated circuit $IC_5$ is the saturation output voltage (about 0.3V) across the output terminals of the photocoupler $Ph_7$. At this time, the output pulse widths of the output terminals (11) and (13) of the integrated circuit $IC_5$ are the widest. That is, the output power of the high frequency transformer TS is the maximum so as to execute the ignition operations of the CCFL tubes or the EEFL tubes. After the charging time of the time constant resistor $R_1$ and the time constant condenser $C_1$ terminates, the output side of the photocoupler $Ph_7$ is in the OFF state. So, the control voltage terminal (6) of the integrated circuit $IC_5$ returns to the originally set voltage, and the two output terminals (11) and (13) of the integrated circuit $IC_5$ return to the originally set pulse widths, which are outputted to the half-bridge type high frequency power output circuit such that the output of the high frequency transformer TS is supplied to the CCFL tubes or EEFL tubes. The voltage of the control voltage terminal (6) is controlled by the photocouplers $Ph_2$ and $Ph_3$. When the output voltage of the high frequency transformer TS decreases due to other factors, the voltage across the positive terminal and the negative terminal of the bridge rectifier $DG_4$ in the CCFL or EEFL tubes protective circuit 500 decreased, wherein the positive and negative terminals are connected to the measurement resistor $R_{M2}$. At this time, the output side of the photocoupler $Ph_3$ is in the OFF state, the transistor $T_4$ is in the ON state, and the V-terminal voltage of the control voltage terminal (6) decreases. So, the pulse widths of the two output terminals (11) and (13) of the integrated circuit $IC_5$ increase. That is, the pulse width of the photocouplers $Ph_4$ and $Ph_5$ outputted to the power MOSFETs $T_1$ and $T_2$ increase such that the output of the high frequency transformer TS greatly increases to achieve the object of compensating for the originally set assumption when the voltage across the two terminals of the high frequency transformer TS decreases. Similarly, if the output voltage across the two terminals of the high frequency transformer TS suddenly increases, the output side of the photocoupler $Ph_2$ is in the ON state, the voltage at the V-terminal increases, and the output pulse widths at the two output terminals (11) and (13) of the integrated circuit $IC_5$ decreases. The output voltage corresponding to the high frequency transformer TS decreases, and the effect of compensating for the voltage rise can be achieved. As mentioned hereinabove, the invention traces the currents of all CCFL tubes or EEFL tubes so as to control the total current of the CCFL tubes or EEFL tubes to a predetermined predefined value according to the voltage value of the measurement resistor $R_{M2}$. The precision voltage regulator of the invention is composed of a voltage comparator $IC_6$, a transistor $T_5$ for executing ON and OFF operations, a current-limiting resistor $R_2$, two photocouplers $Ph_2$ and $Ph_3$, a current-limiting resistor $R_3$ and a voltage stabilizing diode $DZ_1$. The middle point between the current-limiting resistor $R_3$ and the voltage stabilizing diode $DZ_1$ supplies a stabilized power to the voltage source of the comparator $IC_6$. The power supply circuit, which is composed of the resistor $R_4$ and the voltage stabilizing diode $DZ_2$, supplies the power to the negative terminal of the comparator $IC_6$. The resistance value and watt value of the measurement resistor $R_{M2}$ may be determined according to the magnitude of the load current. The positive terminal (S) of the comparator $IC_6$ is the sampling terminal, which may be configured in conjunction with the upper-limit resistor $R_5$, the variable resistor $V_R$ and the lower-limit resistor $R_6$, such that the desired and predefined current value may be obtained to achieve the current stabilizing effect. The voltage stabilizing diode $DZ_3$ is provided to protect the precision voltage regulator of the invention from the overload voltage. The condenser $C_2$ is provided to filter the full-wave current rectified by the full-wave rectifier $DG_4$. If the controlled current is of the DC type, the full-wave rectifier $DG_4$ and the condenser $C_2$ may be omitted. The output side power of the photocoupler $Ph_4$, which is the M-terminal power supply, the output side power of the photocoupler $Ph_5$, which is the O-terminal power supply, and the N-terminal power are independent and have no common connection point but still can be generated by the DC power supply circuit 200, which is one of the feature of the invention. The integrated circuit $IC_7$ is for the amplification of the sawtooth wave. It is to be noted that the invention utilizes the half-bridge type oscillation circuit or the full-bridge type oscillation circuit because the half-bridge and full-bridge type oscillation circuit in the invention have the same operation principle and may be selectively used according to the requirement.

Figure 9:
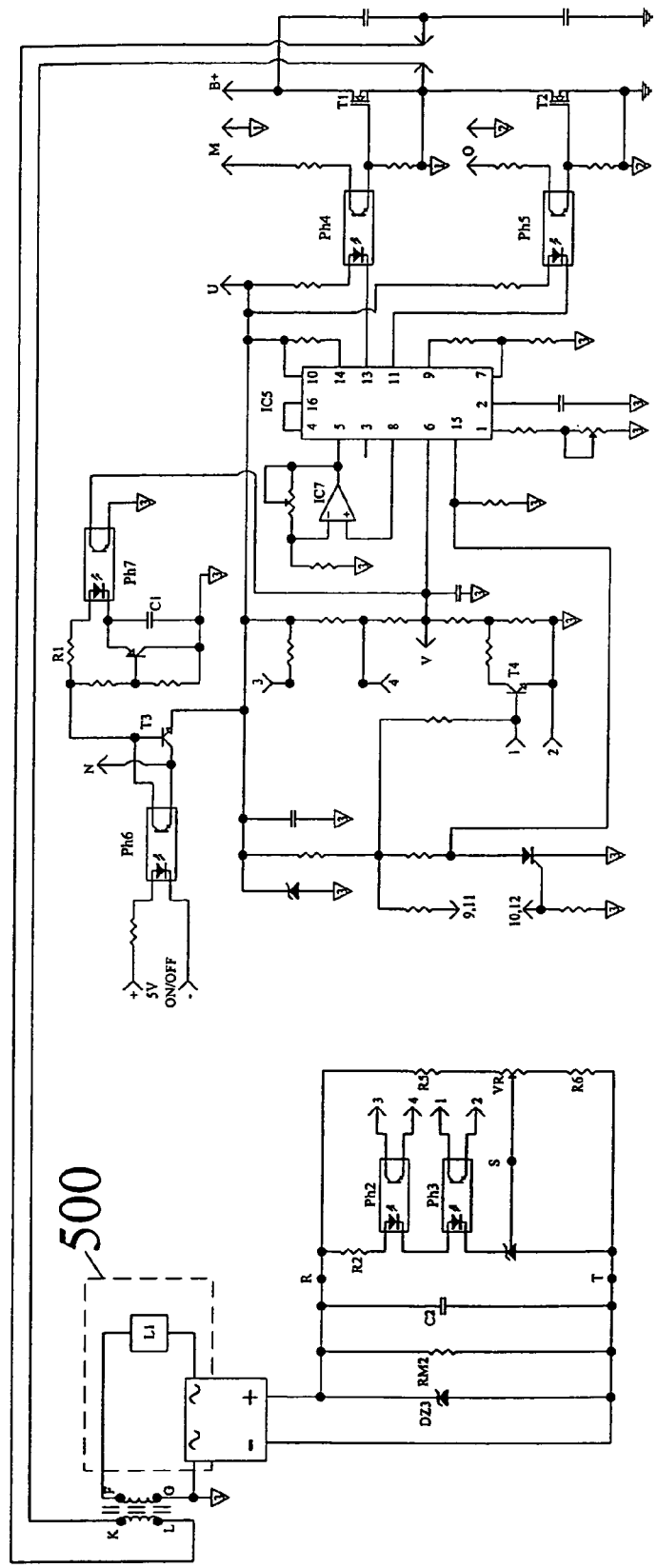
FIG. 9 shows a PWM and high frequency power output circuit according to a second current control embodiment of the invention.

FIG. 9 shows a PWM and high frequency power output circuit according to a second current control embodiment of the invention. The $IC_6$, $R_3$, $R_4$, $T_5$, $DZ_1$ and $DZ_2$ in FIG. 8 are replaced with a tunable precision parallel voltage stabilizing integrated circuit $IC_8$ in FIG. 9. Compared FIG. 9 to FIG. 8, the invention may have a wider range of applications, and the applicable range of the $IC_8$ is limited by the property specification. In some applicable range, the invention can adopt, without any limitation, the tunable precision parallel voltage stabilizing integrated circuit $IC_8$ having the current specification.

Figure 10:
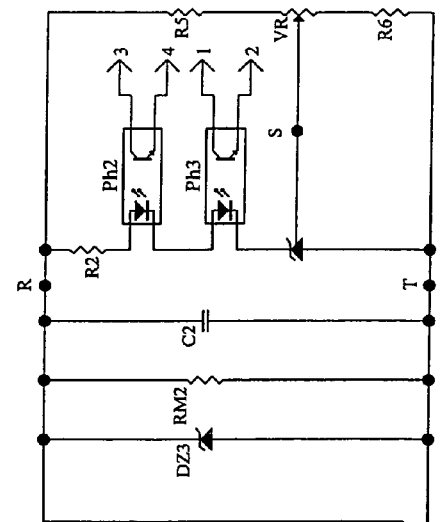
FIG. 10 shows a PWM and high frequency power output circuit according to a third current control embodiment of the invention.
Figure 10:
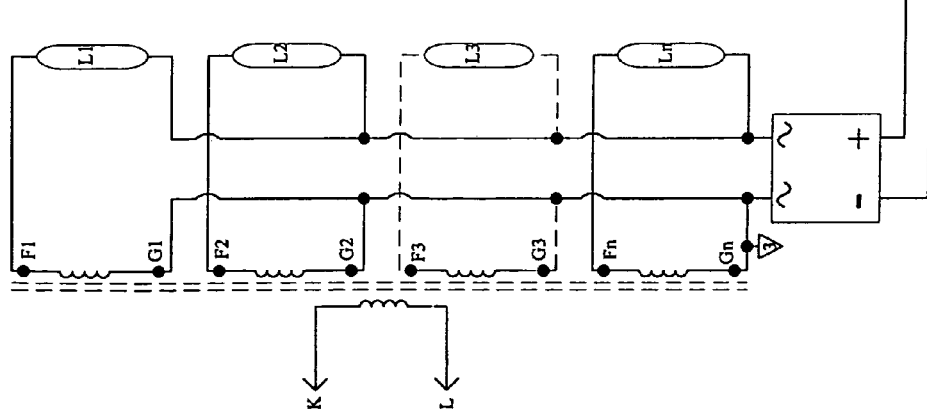

FIG. 10 shows a PWM and high frequency power output circuit according to a third current control embodiment of the invention. FIG. 10 shows an application of multiple secondary coils in the high frequency transformer TS of the invention. As shown in FIG. 10, the control of the total current of the multiple CCFL tubes or EEFL tubes also may be made using the circuit of FIG. 8 with the theory similar to that of FIG. 8, and detailed descriptions thereof will be omitted.

Figure 11:
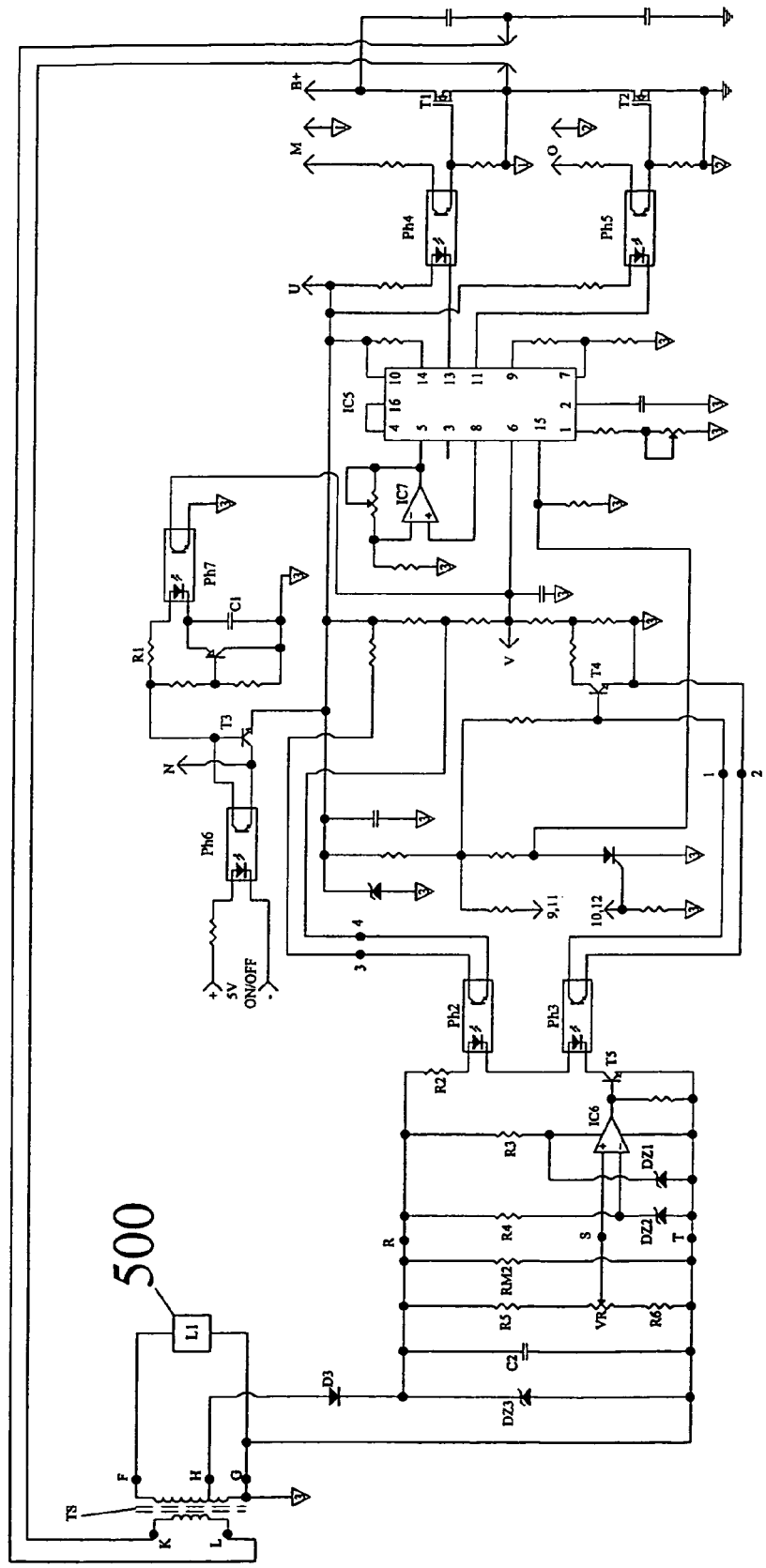
FIG. 11 shows a PWM and high frequency power output circuit according to a voltage control embodiment of the invention.

FIG. 11 shows a PWM and high frequency power output circuit according to a voltage control embodiment of the invention. FIG. 8 applicable to control the total current of the invention is changed to FIG. 11 applicable to control the stable voltage across the two terminals of the high frequency transformer TS. So, FIG. 11 and FIG. 8 have the same operation principle. As shown in FIG. 11, the H point of the high frequency transformer TS serves as the voltage sampling point such that the stable voltage across the two terminals of the high frequency transformer TS can be controlled. The rectifier of FIG. 8 is the full-wave rectifier $DG_4$, but that of FIG. 11 is the half-wave rectifier $D_3$ having the same rectifying function as the rectifier $DG_4$. The half-wave rectifier $D_3$ and the full-wave rectifier $DG_4$ may be exchanged without any limitation.

Figure 12:
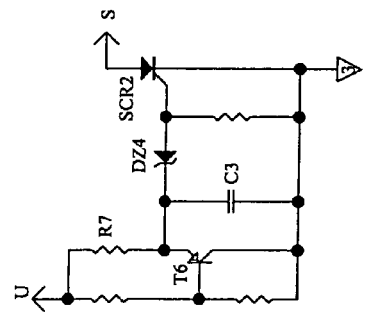
FIG. 12 shows a time delay circuit of the invention.

FIG. 12 shows a time delay circuit of the invention. When the invention is turned on, the overload current, low current; overload voltage and low voltage protective circuits cannot work until a period of time has elapsed. After the CCFL tubes or the EEFL tubes are successfully ignited, the overload current, low current, overload voltage and low voltage protection operations can be enabled so that the successful ignitions of the CCFL tubes or EEFL tubes can be ensured. The delay time is determined according to the time constant resistor $R_7$, the time constant capacitor $C_3$ and the voltage stabilizing diode $DZ_4$. In order to make the grounding property stable, the silicon-controlled rectifier $SCR_2$ is used. However, the NPN transistor also may be used. When the voltage at the u terminal disappears, the charges of the time constant condenser $C_3$ may be discharged through the PNP transistor $T_6$, such that a precise delay effect can be obtained when the u terminal receives a supplied voltage again.

Figure 13:
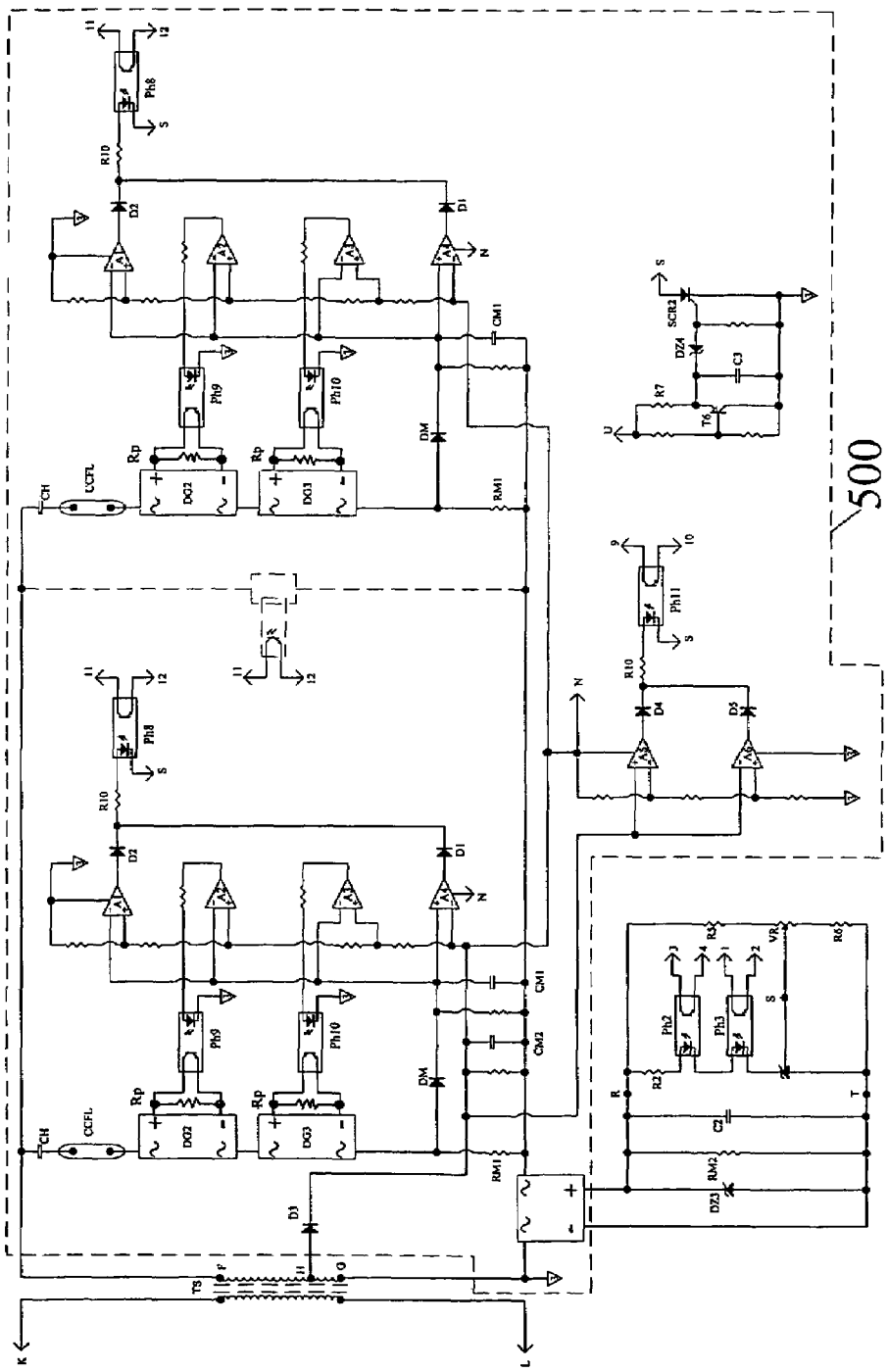
FIG. 13 shows a CCFL tubes or EEFL tubes protective circuit according to a first full circuit embodiment of the invention.

FIG. 13 shows a CCFL or EEFL tubes protective circuit according to a full circuit embodiment of the invention. The operation principles thereof have been described in FIGS. 3, 4, 5, 8 and 11, and detailed descriptions thereof will be omitted.

Figure 14:
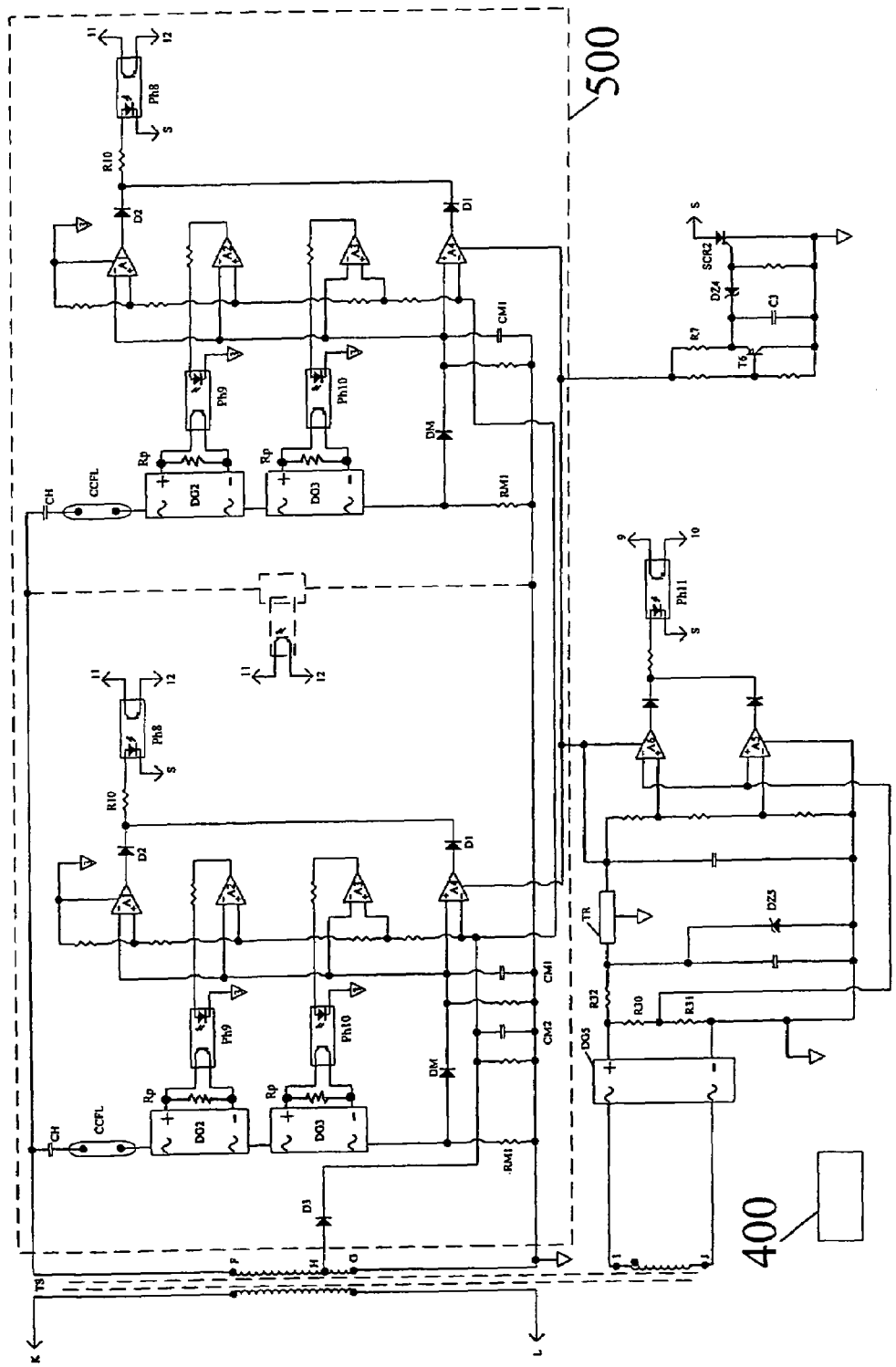
FIG. 14 shows a CCFL tubes or EEFL tubes protective circuit according to a second full circuit embodiment of the invention.
Figure 15:
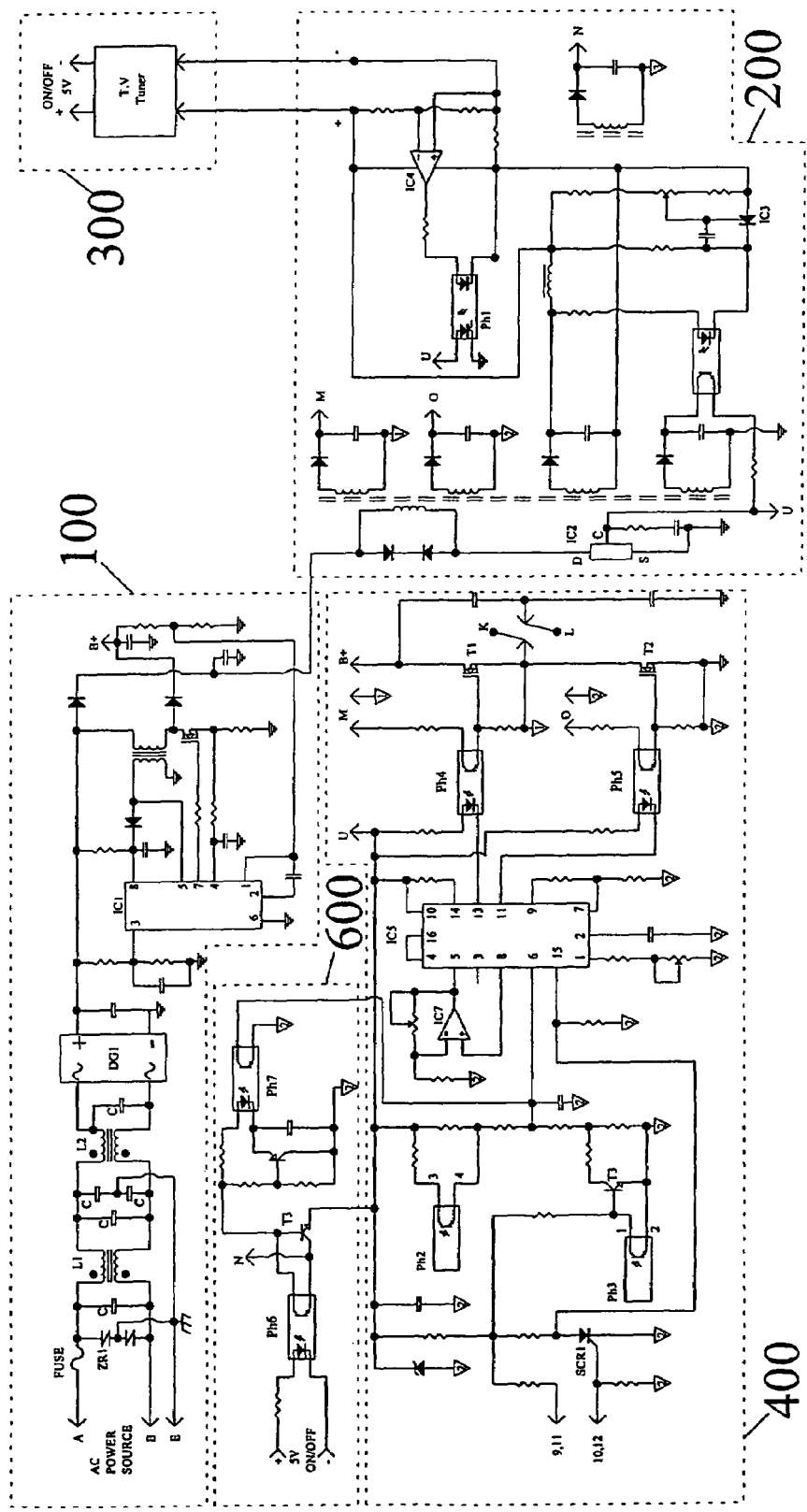
FIG. 15 shows a CCFL tubes or EEFL tubes protective circuit according to a third full circuit embodiment of the invention.

FIG. 14 shows a CCFL or EEFL tubes protective circuit according to a second full circuit embodiment of the invention by changing the N-terminal power of FIG. 13. The high frequency voltage connect to the I and J terminals of the secondary coil of the high frequency transformer TS is rectified by the bridge rectifier $DG_5$ and filtered by the filter condenser $C_{30}$. Then, voltage-dividing resistors $R_{30}$ and $R_{31}$ are connected to the positive and negative output terminals of the bridge rectifier $DG_5$, and the middle point between the voltage-dividing resistors $R_{30}$ and $R_{31}$ is coupled to positive and negative terminals of overload voltage, low voltage comparators $A_5$ and $A_6$ to obtain a reference voltage for overload voltage and low voltage. The setting voltages of the voltage comparators $A_5$ and $A_6$ are taken from the three-terminal voltage regulator TR through the bridge rectifier $DG_5$, the current-limiting resistor $R_{32}$, and the voltage stabilizing diode DZ5. Then, a supplied voltage is outputted to the CCFL or EEFL tubes protective circuit 500 and the delay circuit. In order to avoid the complicated circuit, the PWM and high frequency power output the block 400 only illustrates circuit 400, the circuit diagram of the block 400 is the same as that shown in FIG. 13. The circuit is characterized in that the I and J terminals of the secondary coil of the high frequency transformer TS provides the overload voltage/low voltage reference value and supplies the power to the CCFL or EEFL tubes protective circuit 500, and the grounding thereof is independent. Thus, the N-terminal power in FIG. 2 may be omitted and replaced by the O-terminal power supply, as shown in FIG. 15, which shows a CCFL or EEFL tube protective circuit according to a third full circuit embodiment of the invention. It is to be noted that the invention can select the power supply method of FIG. 2 or 15.

In summary, the invention provides a precision voltage and current control circuit, which is applicable to the PWM circuit and can offer each of the CCFL tubes or EEFL tubes a stable high frequency voltage or a stable high frequency current, such that each of the CCFL tubes or EEFL tubes gets an appropriate compensation current to obtain an optimal emitting efficiency and enhance an emitting quality. The invention also has an overload current, low current, overload voltage and low voltage protective circuit for protecting the CCFL tubes or EEFL tubes such that the invention can be further applicable to the TFT LCD TV or other large LCD panels to develop the optimal display effect of the LCD tubes.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A high frequency power source control circuit, comprising:
    an active power factor corrector, which has input terminals for receiving an AC power and has functions of power factor correcting and voltage boosting;
    a PWM (Pulse Width Modulation) and high frequency power output circuit, which is coupled to the active power factor corrector and is a PWM integrated circuit as a main circuit;
    a DC power supply circuit coupled to the active power factor corrector;
    a DC load system, wherein the DC power supply circuit supplies a DC power to the load system; and
    a starting circuit, wherein the DC load system feeds a signal back to the starting circuit, and when the load system receives the DC power, the load system generates a voltage and outputs the voltage to the PWM and high frequency power output circuit in order to start CCFL tubes or EEFL tubes and offer each of the CCFL tubes or EEFL tubes a stable high frequency voltage or a stable high frequency current, such that each of the CCFL tubes or EEFL tubes gets an appropriate compensation current.

2. The circuit according to claim 1, wherein the DC power supply circuit is a single-piece of switch power integrated circuit outputting an output voltage.

3. The circuit according to claim 2, wherein the DC power supply circuit is an overload current protective circuit composed of comparison integrated circuits, and a photocoupler disables the single-piece of switch power integrated circuit and no DC power is outputted when a load is too large.

4. The circuit according to claim 3, wherein the photocoupler is a structure of a photo thyristor.

5. The circuit according to claim 2, wherein the DC power supply circuit is a multiple independent DC outputs.

6. The circuit according to claim 1, wherein a tuner of a TFT LCD TV serves as one example of the load system, and when the DC power supply system is supplying the DC power to the DC power load system, a voltage is outputted from an output side of the DC power load system as a starting power, and transferred to input terminals of the starting circuit to achieve a starting function.

7. The circuit according to claim 1, wherein output terminals of the integrated circuit of the PWM and high frequency power output circuit respectively transfer pulse signals to gates of two power MOSFETs through photocouplers.

8. The circuit according to claim 7, wherein DC powers for the PWM and high frequency power output circuit and photocouplers are independent powers.

9. The circuit according to claim 8, wherein the half-bridge type electronic ballast or a full-bridge type oscillation circuit.

10. The circuit according to claim 9, wherein the precision voltage regulator can be a programmable precision shunt regulator integrated circuit.

11. The circuit according to claim 1, wherein:
    the PWM and high frequency power output circuit further comprises a programmable precision voltage regulator, which is composed of a voltage comparator, a transistor, a current-limiting resistor, a photocoupler, and a voltage stabilizing diode.

12. The circuit according to claim 1, wherein:
    the starting circuit generates a voltage for responding the load system, when the load system is supplied with the DC power, said voltage is used for starting CCFL tubes or EEFL.

13. The circuit according to claim 1, further comprising a protective circuit for protecting the load, wherein a, primary coil of a high frequency transformer of said protective circuit is coupled to a half-bridge type oscillation circuit of the PWM and high frequency power output circuit, and a secondary coil of said the-high frequency transformer is coupled to a CCFL circuit.

14. The circuit according to claim 13, wherein the high frequency transformer has multiple secondary coils for independently supplying power to the CCFL or EEFL circuit.

15. The circuit according to claim 13, wherein the primary coil of the high frequency transformer is coupled to a full-bridge type electronic ballast of the PWM.

16. The circuit according to claim 13, wherein the protective circuit is characterized in that the secondary coil of the high frequency transformer is coupled to one or multiple high-voltage condensers, a CCFL or EEFL, one or multiple bridge rectifiers, one or multiple measurement resistors, which are serially connected to form a basic unit of a CCFL or EEFL set.

17. The circuit according to claim 16, wherein multiple CCFL or EEFL sets of the protective circuits can be connected in parallel.

18. The circuit according to claim 13, wherein the protective circuit can perform the function of overload current protection, when the voltage across the two terminal of the measurement resistor of a CCFL or EEFL tube unit is over a predetermined value, it means that the CCFL or EEFL tube unit is short-circuited or has a leakage current, so that an object of overload current protection is achieved.

19. The circuit according to claim 13, wherein the protective circuit can perform the function of low current protection when the voltage across the two terminals of the measurement resistor is under a predetermined value or equal to zero, it means that the CCFL or EEFL tubes are open-circuited or the voltage across the two terminals of the secondary coil of the high frequency transformer is under a predetermined value, so that an object of low current protection is achieved.

20. The circuit according to claim 13, wherein:
    the protective circuit can perform the function of overload voltage protection;
    when the voltage across two terminals of the secondary coil of the high frequency transformer rises, the voltage at the measurement voltage terminal rises too, such that the voltage across two terminals of the filter condenser also rises; and
    if the voltage of the filter condenser is higher than a set voltage of the negative there is no voltage across the two terminal of the secondary coil of the high frequency transformer, so that the object of overload voltage protection is achieved.

21. The circuit according to claim 13, wherein the protective circuit can be a low voltage protective circuit, when a voltage across two terminals of the secondary coil of the high frequency transformer is under a predetermined value, the voltage across two terminals of the filter condenser decreases, the two terminals of the secondary coil of the high frequency transformer has no voltage output, so that the object of the low voltage protection is achieved.

22. The circuit according to claim 13, wherein the protective circuit can perform the function of any combination of overload current protection, low current protection, overload voltage protection, low voltage protection.

23. A CCFL or EEFL protective circuit, comprising:
secondary coils of a high frequency transformer: electrically connected to one or multiple high-voltage condensers;
a capacitor with one terminal electrically connected to the secondary coils of said high frequency transformer, and the other terminal electrically connected to the CCFL or EEFL;
a CCFL or EEFL with one terminal electrically connected to said capacitor, and the other terminal electrically connected to the bridge rectifier;
one or multiple bridge rectifiers, wherein, for each rectifier, one terminal of which is electrically connected to said CCFL or EEFL, and the other terminal of which is electrically connected to the measurement resistor;
one or multiple measurement resistors, wherein, for each resistor, one terminal of which is electrically connected to said bridge rectifier, and the other terminal of which is electrically connected to the secondary coils of said high frequency transformer; and
a delay circuit, wherein the delay time is determined by the time constant resistor, the time constant capacitor and the voltage stabilizing diode, the protective circuit will be triggered on when the protective circuit is stable and after a period of delay time.

24. The circuit according to claim 23, wherein multiple CCFL or EEFL sets can be connected in parallel.

25. The circuit according to claim 24, which can perform the function of low voltage protection, wherein when a voltage across two terminals of the secondary coil of the high frequency transformer is under a predetermined value, the voltage across two terminals of the filter condenser decreases, and the two terminals of the secondary coil of the high frequency transformer has no voltage output, so that the object of the low voltage protection is achieved.

26. The circuit according to claim 23, which can perform the function of overload current protection, wherein when a voltage across two terminals of a measurement resistor of the CCFL tubes or EEFL tubes is over a predetermined value, it represents that the CCFL tubes or EEFL tubes is short-circuited or has a leakage current, so that an object of overload current protection is achieved.

27. The circuit according to claim 23, which can perform the function of low current protection, when the voltage across the two terminals of the measurement resistor is under a predetermined value or equal to zero, it means that the CCFL tubes or EEFL tubes are open-circuited or the voltage across the two terminals of the secondary coil of the high frequency transformer is under a predetermined value, so that an object of low current protection is achieved.

28. The circuit according to claim 23, which can perform the function of overload voltage protection, wherein:
when the voltage across two terminals of the secondary coil of the high frequency transformer rises, the voltage at the measurement voltage terminal rises too, such that the voltage across two terminals of the filter condenser also rises;
if the voltage of the filter condenser is higher than a set voltage of the negative terminal of a comparator, the comparator $A_5$ outputs a positive voltage to disable the integrated circuit, and there is no voltage across the two terminals of the secondary coil of the high frequency transformer, so that the object of overload voltage protection is achieved.

29. The circuit according to claim 23, which can perform the function of any combination of overload current protection, low current protection, overload voltage protection and low voltage protection.

* * * * *